United States Patent
Bharali et al.

(10) Patent No.: US 8,289,982 B2
(45) Date of Patent: *Oct. 16, 2012

(54) EFFICIENT DISCOVERY AND VERIFICATION OF PATHS THROUGH A MESHED OVERLAY NETWORK

(75) Inventors: Anupam A. Bharali, San Jose, CA (US); Balraj Singh, Los Altos, CA (US); Manish H. Sampat, Fremont, CA (US); Amit P. Singh, Los Altos, CA (US); Rajiv Batra, Saratoga, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 290 days.

This patent is subject to a terminal disclaimer.

(21) Appl. No.: 12/728,944

(22) Filed: Mar. 22, 2010

(65) Prior Publication Data

US 2010/0238934 A1    Sep. 23, 2010

Related U.S. Application Data (63) Continuation of application No. 11/805,488, filed on May 23, 2007, now Pat. No. 7,769,019, which is a continuation of application No. 10/226,502, filed on Aug. 23, 2002, now Pat. No. 7,230,949.

(60) Provisional application No. 60/314,692, filed on Aug. 24, 2001.

(51) Int. Cl.
*H04L 12/28* (2006.01)

(52) U.S. Cl. .................. 370/401; 370/389; 370/400

(58) Field of Classification Search ............... 370/370, 370/389, 395.31, 395.2, 386, 392, 397, 399, 370/395.3, 400–402, 395.53, 395.54, 351, 370/395.32

See application file for complete search history.

(56) References Cited

U.S. PATENT DOCUMENTS

| | | | |
|---|---|---|---|
| 4,322,795 A | 3/1982 | Lange et al. | |
| 4,876,541 A | 10/1989 | Storer | |
| 5,450,562 A | 9/1995 | Rosenberg et al. | |
| 5,708,659 A | 1/1998 | Rostoker et al. | |
| 5,754,791 A | 5/1998 | Dahlgren et al. | |
| 5,940,596 A | 8/1999 | Rajan et al. | |
| 6,339,595 B1 | 1/2002 | Rekhter et al. | |
| 6,351,465 B1 | 2/2002 | Han | |
| 6,363,056 B1 | 3/2002 | Beigi et al. | |
| 6,369,855 B1 | 4/2002 | Chauvel et al. | |
| 6,484,210 B1 | 11/2002 | Adriano et al. | |
| 6,614,785 B1 | 9/2003 | Huai et al. | |
| 6,760,336 B1 | 7/2004 | Mangin et al. | |
| 6,771,646 B1 | 8/2004 | Sarkissian et al. | |
| 6,785,237 B1 | 8/2004 | Sufleta | |
| 6,907,048 B1 | 6/2005 | Treadaway et al. | |
| 6,937,574 B1 | 8/2005 | Delaney et al. | |
| 7,230,949 B2* | 6/2007 | Bharali et al. | 370/395.2 |
| 7,769,019 B2* | 8/2010 | Bharali et al. | 370/395.2 |
| 2002/0044553 A1 | 4/2002 | Chakravorty | |
| 2003/0058856 A1 | 3/2003 | Salett et al. | |

* cited by examiner

*Primary Examiner* — Brenda H Pham
(74) *Attorney, Agent, or Firm* — Shumaker & Sieffert, P.A.

(57) ABSTRACT

The present invention provides an efficient system and method for routing information through a dynamic network. The system includes at least one ingress point and one egress point. The ingress and egress point cooperate to form a virtual circuit for routing packets to destination subnets directly reachable by the egress point. The egress point automatically discovers which subnets are directly accessible via its local ports and summarizes this information for the ingress point. The ingress point receives this information, compiles it into a routing table, and verifies that those subnets are best accessed by the egress point. Verification is accomplished by sending probe packets to select addresses on the subnet. Additionally, the egress point may continue to monitor the local topology and incrementally update the information to the ingress to allow the ingress to adjust its compiled routing table.

11 Claims, 7 Drawing Sheets

EFFICIENT DISCOVERY AND VERIFICATION OF PATHS THROUGH A MESHED OVERLAY NETWORK

This application is a continuation of U.S. patent application Ser. No. 11/805,488, entitled "Efficient Discovery and Verification of Paths Through a Meshed Overlay Network", filed May 23, 2007 by Anupam A. Bharali et al, which is a continuation of U.S. patent application Ser. No. 10/226,502, entitled "Efficient Method and System For Automatic Discovery and Verification of Optimal Paths Through A Dynamic Multi-Point Meshed Overlay Network", filed Aug. 23, 2002 by Anupam A. Bharali et al., now issued as U.S. Pat. No. 7,230,949 on Jun. 12, 2007, which claims priority under 35 U.S.C. §119(e) to U.S. Provisional Application Ser. No. 60/314,692, entitled "Efficient Method and System for Automatic Discovery and Verification of Optimal Paths through A Dynamic Multi-point Meshed Overlay Network", filed Aug. 24, 2001 by Anupam A. Bharali et al., the subject matter of each being incorporated herein by reference in their entirety.

RELATED APPLICATIONS

This application is also related to U.S. patent application Ser. No. 09/915,939, entitled "Network Architecture and Methods For Transparent On-Line Cross-Sessional Encoding and Transport of Network Communications Data", filed Jul. 25, 2001 by Amit P. Singh, the subject matter of which is incorporated by reference in its entirety herein.

This application is also related to U.S. patent application Ser. No. 09/872,184, entitled "System and Method for Incremental and Continuous Data Compression", filed May 31, 2001 by Amit P. Singh, the subject matter of which is incorporated by reference in its entirety herein.

BACKGROUND OF THE INVENTION

1. Field of the Invention

This invention relates generally to the field of Computer Networking and specifically to the field of Routing in Computer Networks.

2. Description of Background Art

A goal of conventional communication systems which convey packetized information is to be able to quickly and efficiently route individual packets of information from the source computer to the destination computer, without undue delay or loss. However, conventional routed networks rely on individual routers to decide the path along which a packet traverses across a network, e.g., a wide area network (WAN). In conventional routed networks, a router collects routing information from its neighboring routers and/or its local manually configured routes. The conventional router does not examine network statistics and routing information for any part of the network that is not directly connected to the router. The router may also gather information on routes that it has been manually configured to implement. Based on this limited local information, the router decides the next router to forward traffic to.

Conventional routers are oblivious to the path taken by a packet beyond the next router. Without being able to calculate the entire path taken by the packet, a router may inadvertently send a packet down a path which may dead-end or may significantly degrade transmission times of the packet to the required destination node.

In addition, conventional routing solutions do not adapt to select an optimal path in the WAN. In addition to the creation of lost or underliverable packets due to a conventional router's poor routing choices, routers may also have different transmission times depending on which router they are sending or receiving data from. Since conventional networks are commonly composed of a variety of different speed lines, it is possible for two separate paths through the WAN to reach the same destination at different times. Based on the local information available to a conventional router, it would be unable to accurately predict which path would reach the intended destination quicker.

These inefficiencies are exacerbated by the realization that the network is not static. The transmission speed of a router may change between an initial time and a subsequent time. Furthermore, a router may need to be taken off-line, removing a potential path as well as removing any manually configured routes. Conventional routers are unable to recognize when a router closer to the required destination has been taken off line or has slowed down significantly. Since it cannot detect disabled routers further downstream, a conventional router would not be able to intelligently choose a different path to avoid the disabled router. As such, the conventional router cannot efficiently choose its route for any given data packet.

What is needed is an efficient method and system for routing information in a dynamic multi-point network which (1) can automatically discover and track changes for an entire meshed overlay network, (2) can verify the existence of optimal routing paths through the meshed overlay network, and (3) can select an optimal routing path through the network based on up-to-date network statistics.

SUMMARY OF THE INVENTION

The present invention is a system and method for automatically identifying and verifying optimal routing paths through a dynamic multi-point meshed overlay network at an ingress point.

In one embodiment, the system may include at least one ingress router and one potential egress router located on a base network and in communication with each other. Each egress router constantly monitors local network traffic. In one embodiment, this monitoring is done in a passive capacity with the egress router not participating in conventional routing activities. In another embodiment, the egress router actively routes network packets.

In one embodiment, the egress router compiles the information and statistics regarding destinations, which are directly reached via the egress router. This information is then reported, or advertised, to the ingress router. In one embodiment the ingress router collects the advertised information from its associated egress routers and compiles an initial routing table in order to set up an overlay network.

In one embodiment, the egress router continues to monitor network traffic once the overlay network is initialized and reports changes to the ingress router. In one embodiment, these reported changes are advertised through an incremental report, where only changed information, including added and removed destinations and changes in cost to reach a particular destination is included in the report. The ingress router updates its routing table with these incremental changes.

In one embodiment, once the system is initialized, the ingress router verifies that the destinations advertised by each egress router are reachable through the base network through that router. Additionally, in one embodiment, the ingress router may make a determination as to a total cost for forwarding packets to any given egress router versus an alternate egress router advertising the same destination.

In one embodiment, the ingress router verifies the optimal overlay paths by sending a plurality of probe packets to each destination subnet. In one embodiment the egress router which receives these packets (and presumably advertised the destination to the ingress router) stops the probe packets and reports back to the ingress router that they were received. In another embodiment, the egress router allows multiple instances of a probe packet to be forwarded on to another egress router downstream to allow the ingress router to verify a cascaded meshed overlay network.

DETAILED DESCRIPTION OF THE PREFERRED EMBODIMENTS

A preferred embodiment of the present invention is now described with reference to the figures where like reference numbers indicate identical or functionally similar elements. Also in the figures, the left most digit of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" or "in an embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

The language used in the specification has been principally selected for readability and instructional purposes, and may not have been selected to delineate or circumscribe the inventive subject matter. Accordingly, the disclosure, including the term descriptions set forth below, of the present invention is intended to be illustrative, but not limiting, of the scope of the invention.

The following terminology is used below in describing various embodiments of the present invention. These characterizations are provided to enhance the readability and understanding of one or more embodiments of the present invention. These descriptions are not intended to limit the invention and are merely illustrative.

Base Network: A conventional network consisting of interconnected networking elements are referred to as a Base Network.

Overlay Terminal: The endpoints of a virtual network circuit are referred to as overlay terminals.

Overlay Network: A collection of virtual network circuits can form an overlay network. An overlay network utilizes the base network components to establish the virtual network circuit and communicate between the overlay terminals. The overlay network can provide encapsulation of data between its terminals. A typical use of an overlay network is to provide secure connections between remote users and corporate private network even if the base network is a public network.

Overlay Router: In one embodiment, an overlay router is a routing device that can forward incoming traffic in an overlay network. This may be implemented as a software or hardware module in a conventional router. This feature can also be implemented in a standalone networking device or as a module in other networking equipment, for example. For ease of discussion the following description presumes than an overlay router is implemented in a standalone networking device.

Ingress and Egress points: In one embodiment, for unidirectional network traffic flowing through an overlay network, the overlay terminal at which the traffic enters the overlay network is called the ingress point and the overlay terminal at which the traffic leaves the overlay network is called the egress point. A bi-directional circuit can be considered as a collection of two unidirectional circuits. For bi-directional overlay network, an overlay router serves as the ingress and egress point for traffic flowing in opposite directions.

Local and remote ports: The ports on the overlay router can be partitioned into local and remote ports. A virtual network circuit can be established between two overlay routers if the overlay terminals for the circuit communicate through their remote ports. Both the ingress and egress point for a circuit can validate this configuration at their respective ends.

Supported destination subnet: In one embodiment, supported destination subnets are the subnets that are reachable through a local port of the egress point.

Any network (subnet) is a supported destination subnet if there is a host (d) in this network such that for some host (s), the path from source (s) to destination (d) in the base network includes ingress point and egress point of the circuit in that order. This path is represented as: s->Ingress->Egress->d. In other words, the supported destination subnets can be subnets reachable from the egress point and the normal network path (route) in absence of a virtual network circuit from ingress point to these subnets always traverses through the egress point.

Supported source subnet: Supported source subnets can be the subnets that are reachable through a local port of the ingress point.

In one embodiment, the ingress and egress points are co-located on an overlay router device and the supported source subnets of the ingress point are the same as the supported destination subnets of the egress point on this device.

Multi-point Meshed Overlay Network: In one embodiment, a multi-point meshed overlay network is an overlay network where multiple virtual network circuits can originate from a single overlay terminal and where the virtual network circuit form a meshed (full-mesh or partial-mesh) configuration.

In one embodiment of the present invention the overlay network emulates the base network routing. Without one embodiment of this invention, one would be forced to manually configure each overlay router with a circuit routing table. Manual configuration is not a scalable solution and is prone to faulty configuration in a dynamically changing network. In one embodiment, the routing is automatically configured resulting in optimal routing in a dynamic network.

An immediate use of the invention is in the creation of dedicated tunnels at various points in the network and cache information at those elements to use lesser bandwidth. A more detailed description of this is set forth in U.S. patent application Ser. No. 09/915,939, filed on Jul. 25, 2001 by Amit P. Singh, "Network Architecture for Transparent On-line Encoding and Transport of Network Communication Data" that is incorporated by reference herein in its entirety.

Figure 1:
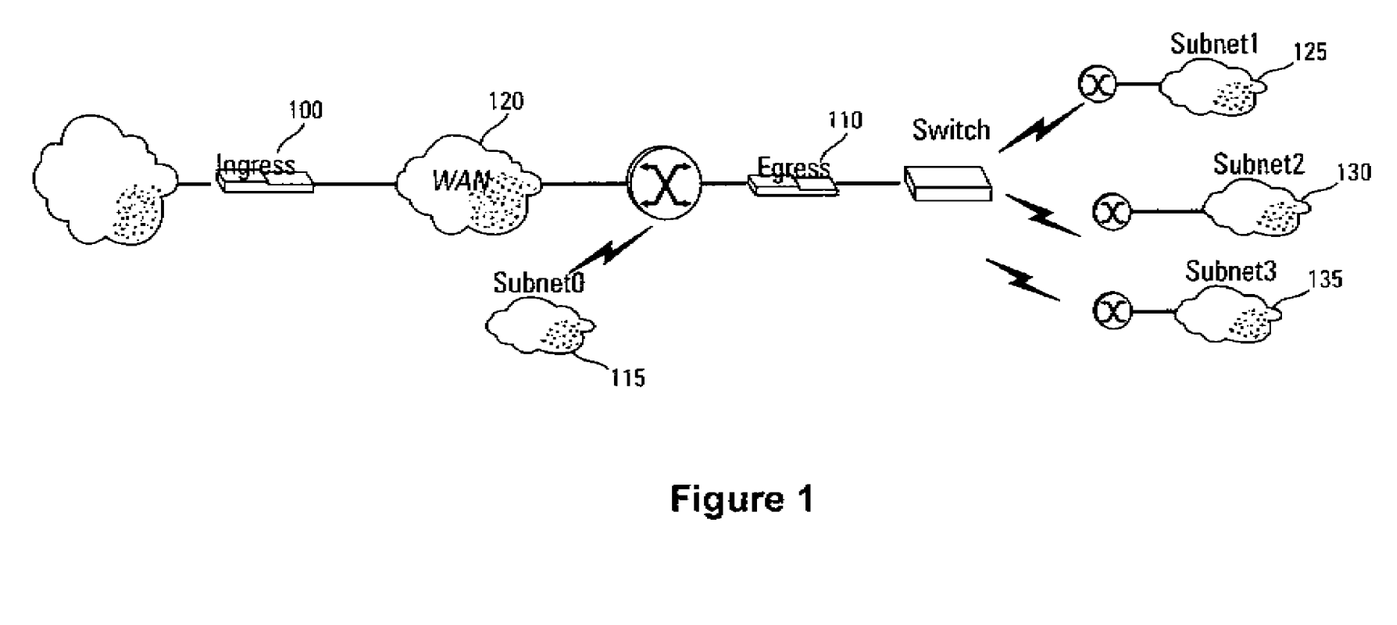
FIG. 1 is an illustration of a virtual network having one ingress and one egress point.

FIG. 1 is an illustration of one example of the present invention in a network environment. In FIG. 1 an ingress point 100 and an egress point 110 form an overlay network. As noted above, in one embodiment the ingress point 100 and the egress point 110 are each overlay routes within the overlay network which form the required virtual circuit. In one embodiment, for every packet entering the ingress point 100, a decision is made regarding the selection of a virtual network circuit. In a multi-point network, the ingress point 100 serves as an overlay terminal for a number of virtual network circuits whose egress points are in diverse remote locations. FIG. 1 illustrates such a virtual network having a single ingress point 100 connected to a single egress point 110 via a WAN 120. In this figure, the egress point 110 has a plurality of supported destination subnets identified as Subnet1 125, Subnet2 130, and Subnet3 135.

A virtual network circuit may serve multiple destination networks. For example, in FIG. 1, the virtual network circuit formed by ingress 100 and egress 110 devices can be used to serve Subnet1 125, Subnet2 130 and Subnet3 135, but not Subnet0 115. Since Subnet0 115 is not directly reached by the egress point 110, nor is it accessible through the local ports of egress point 110, it will not be served by the virtual network circuit formed by ingress 100 and egress 110.

As described below, one embodiment of the present invention enables an ingress point 100 to automatically determine all supported destination subnets for all circuits originating from this overlay terminal and to automatically select an optimal virtual network circuit for any incoming traffic so that it can forward encapsulated traffic to an egress point 110 for the selected circuit. The notion of optimality is dependent on the application environment, and will be apparent to one skilled in the art.

Figure 2:
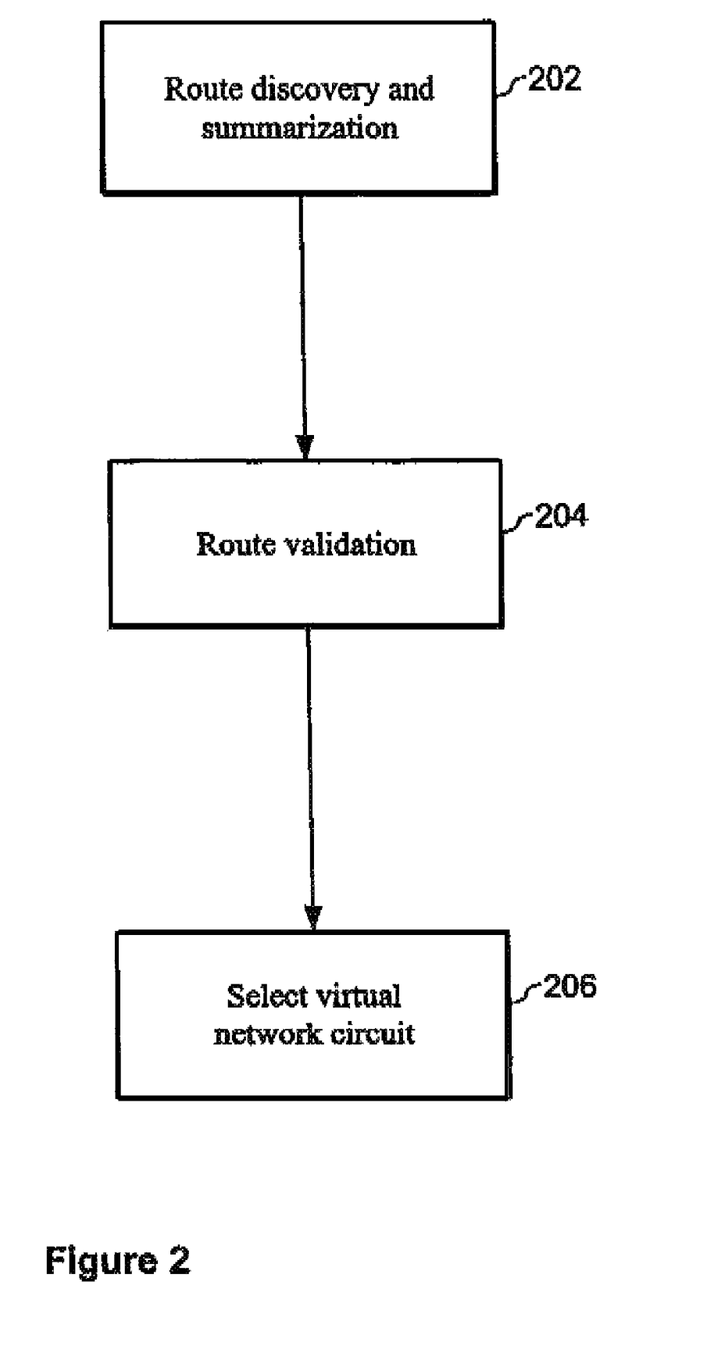
FIG. 2 is a flow chart illustrating a route discovery and verification technique according to one embodiment of the present invention.

FIG. 2 is an illustration identifying the route discovery and verification method according to one embodiment of the present invention. One embodiment of the present invention performs 202 route discovery and summarization then performs 204 route validation and then selects 206 the virtual network circuit. A more detailed description of each of these steps is set forth herein.

Figure 3:
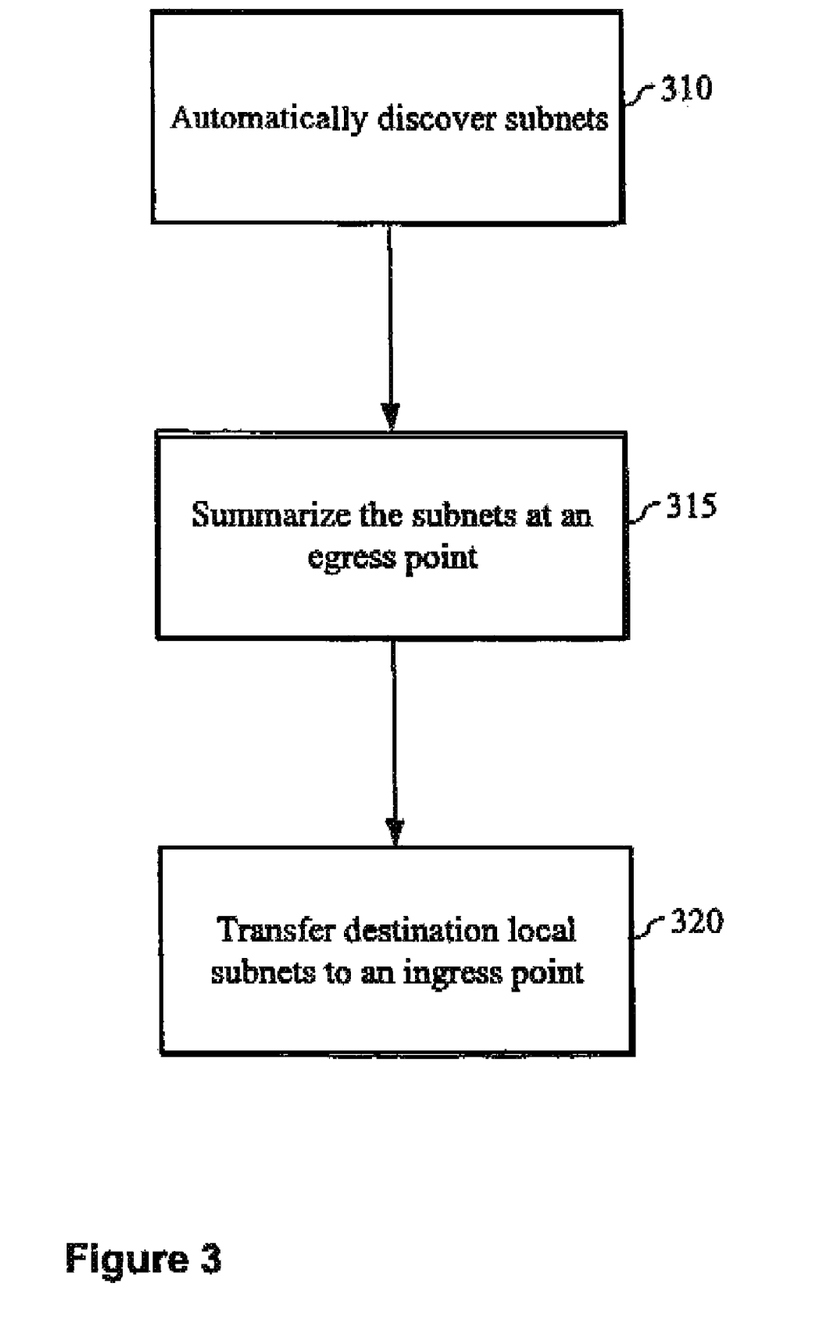
FIG. 3 is a flow chart illustrating a route discovery and summarization technique according to one embodiment of the present invention.

FIG. 3 is an illustration of the route discovery and summarization technique 202 according to one embodiment of the present invention. In one embodiment of the present invention, automatic discovery of supported destination subnets begins by automatically discovering 310 subnets that are accessible through local ports at an egress point 110. To discover 310 the subnets that are accessibly through local ports, the egress point 110 compiles a list of routes directly connected to it or reachable through its local ports. The overlay router can gather this information by passively listening to the routing update messages of standard routing protocols (e.g., routing information protocol (RIP), open shortest path first (OSPF), intermediate system to intermediate system (ISIS), border gateway protocol (BGP)) or by actively participating in the routing.

When in the passive mode, an overlay router is a transparent node in the network. Specifically, in one embodiment the overlay router can implement RIP version 2 protocol in a supplier mode and listen only for RIP updates. In another embodiment, the overlay router can implement the OSPF version 2 protocol in "host mode".

When in the active mode, the overlay router is a non-transparent device and adds a routing hop to the network path.

In addition to compiling information regarding destinations on its local ports, some, or all, of the supported destination subnets may also be configured manually on the overlay router. This configuration may be performed as part of the router's operation in the base network and be implemented using any conventional configuration technique. Once the egress point 110 has collected information regarding its manually configured subnets and discovered subnets directly reachable via its local ports, it summarizes 315 this information. An egress point 110 can collapse, or consolidate, the compiled subnets into destination local subnets through an analysis of network, mask and cost metric. During the summarization 315, the network and mask values of multiple original subnets may be readjusted or consolidated into a single destination local subnet. In another embodiment, the network and mask values are consolidated using any commonly known data compression algorithm. Summarization is an optimization step to reduce the number of destination local subnets and data sent to the ingress point 100. The summarized destination local subnets are then transferred 230 to the ingress point 100. An egress point 110 can transfer 230 the destination local subnets to multiple ingress points 100 of the overlay network. The automatic discovery and summarization 202 action may be taken at the time of creation of the virtual network circuit.

In one embodiment, the automatic discovery and summarization 202 step is continually performed by the egress point 110. The overlay router may constantly monitor for any network topology change or an attribute change (e.g., route, gateway, cost, etc.). If a change is detected, these changes are summarized (consolidated) and incrementally transferred to the ingress point 100. This will be discussed in more detail with respect to FIG. 4 below.

In one embodiment of the present invention a route entry for each discovered subnet may include a network destination IP address of the destination, a route mask, a gateway IP address of the next hop router, an interface, a route type, a route protocol, a route age, and a route metric. In one embodiment the route mask is a bit mask that is typically logically ANDed with a destination address before comparing with destination subnet. In this way, a route mask may distinguish the network and host part of the destination address. E.g., a mask value of 255.255.255.255 is used to indicate a host route. The interface entry is used for forwarding packets to the destination network. The interface entry may include user specified names for various network interfaces. In Table 1 below, two entries le0 and le1 are used to indicate that the interface is an Ethernet media type by including the letter "e". Additionally, the 0 and 1 are chosen as interface indices. In one embodiment the interface entry may indicate various forms of interface media including 10 megabit (MB), 100 MB, or gigabit Ethernet as well as Token Ring or Fiber Distributed networks. The route type entry may be direct, indirect, invalidated route, or other. The route protocol entry notes the protocol used to discover the route by the egress point 110, e.g. RIP, OSPF, BGP, ICMP redirect, or other. The route age entry indicates the last update time of the route in seconds. The route metric entry is typically a value from one to five and reflects the various routing metrics depending on the routing protocol used. The route metric may also be known as a route cost and is typically a dimensionless quantity based on the specific protocol used to implement the route. For instance, for the RIP protocol, the cost is measured as the number of intermediate routers used to reach the destination. For OSPF protocols multiple metrics may be used. Typically the metric is based on the link state, which is the cost assigned to a particular interface. Additionally, the route cost may be used to indicate preferred routes and service providers by providing a lower cost metric for those preferred routes.

Figure 5:
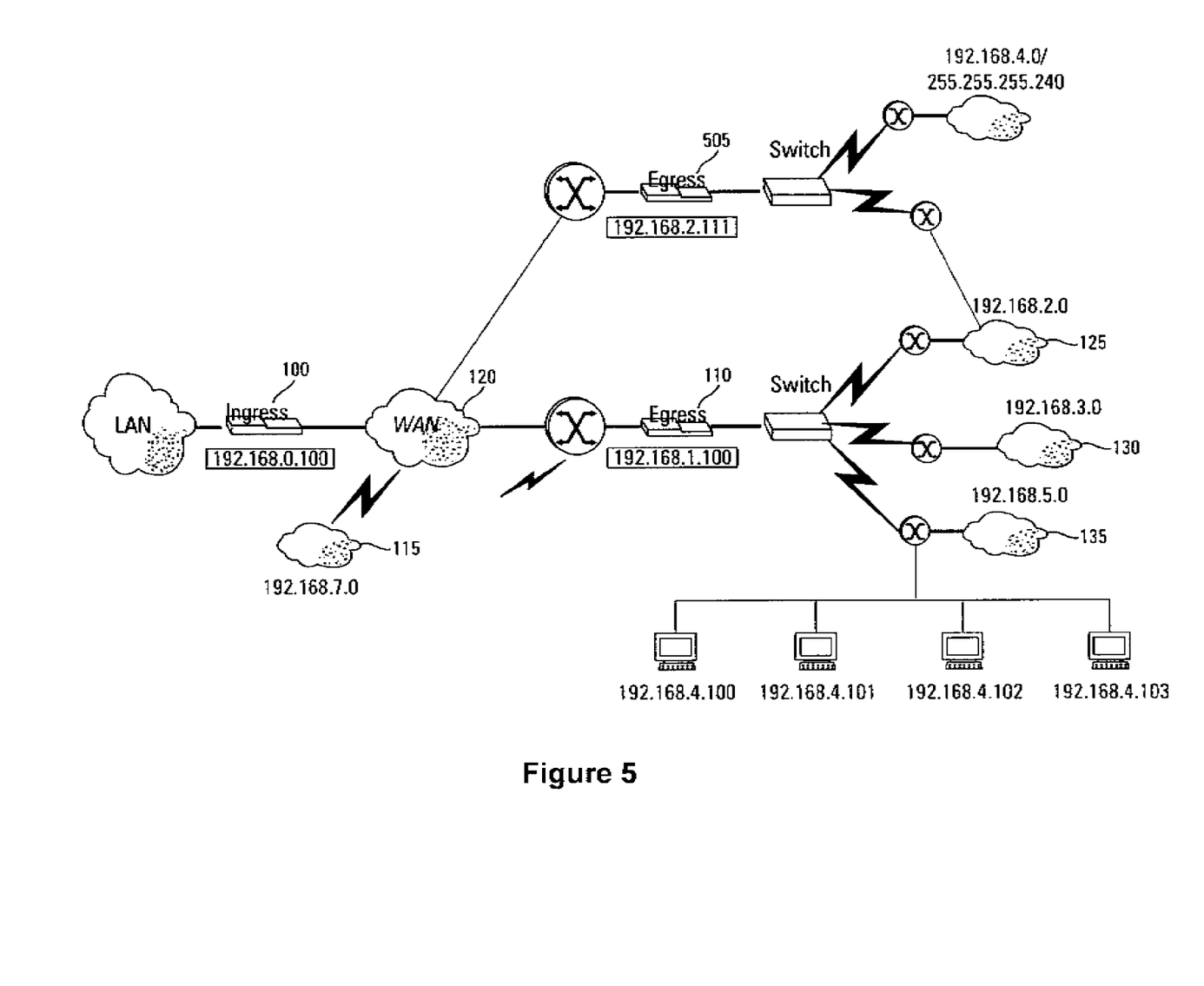
FIG. 5 is an illustration of an example of a virtual network.

For illustration purposes, consider an overlay network with ingress point IP address 192.168.0.100. The following description refers to Table 1 and FIG. 5. Table 1 is an example of routing information collected 310 at an egress point 110 with IP address 192.168.1.100. FIG. 5 is an illustration of an example of a network in which the present invention can operate.

TABLE 1

| Destination | Route Mask | Gateway | Interface | Route/Cost Metric | Protocol |
| --- | --- | --- | --- | --- | --- |
| 192.168.1.0 | 255.255.255.0 | 192.168.1.1 | le0 | 0 | RIP |
| 192.168.2.0 | 255.255.255.0 | 192.168.1.1 | le0 | 1000 | static |
| 192.168.3.0 | 255.255.255.0 | 192.168.1.1 | le0 | 2 | RIP |
| 192.168.4.100 | 255.255.255.255 | 192.168.0.1 | le1 | 5 | OSPF |
| 192.168.4.101 | 255.255.255.255 | 192.168.0.1 | le1 | 5 | OSPF |
| 192.168.4.102 | 255.255.255.255 | 192.168.0.1 | le1 | 5 | OSPF |
| 192.168.4.103 | 255.255.255.255 | 192.168.0.1 | le1 | 5 | OSPF |
| 192.168.5.0 | 255.255.255.0 | 192.168.1.1 | le0 | 3 | RIP |

As noted above, one embodiment of the present invention summarizes 315 the subnets discovered at the egress point 110. The route attributes that are relevant to the egress point are the destination network, route mask, metric and the protocol information. The egress point 110 collapses the subnets that were compiled in the automatic discovery process into destination local subnets by analyzing the network, mask and cost metric. The network and mask values of multiple original subnets can be readjusted to a single destination local subnet. This is an optimization step to reduce the number of destination local subnets. The ingress point 100 will subsequently rebuild the values of the multiple subnets based on the condensed address and mask. One skilled in the art may recognize other ways in which to summarize the compiled route information.

The routing information in the above example is summarized below in Table 2. In this example, the four host routes (for the computers at IP addresses 192.168.4.100, 192.168.4.101, 192.168.4.102, and 192.168.4.103) are summarized into a single subnet route (i.e., 192.168.4.100 with a route mask of 255.255.255.252). As noted above, once this subnet route and route mask are reported to the ingress point 100, the ingress point 100 will reconstruct the four host routes based on the summarized information.

TABLE 2

| Destination | Route Mask | Route/Cost Metric | Protocol |
| --- | --- | --- | --- |
| 192.168.1.0 | 255.255.255.0 | 0 | static |
| 192.168.2.0 | 255.255.255.0 | 1000 | static |
| 192.168.3.0 | 255.255.255.0 | 2 | RIP |
| 192.168.4.100 | 255.255.255.252 | 5 | OSPF |
| 192.168.5.0 | 255.255.255.0 | 3 | RIP |

Once the route information is summarized 315, the egress point 110 transfers 320 the destination local subnet information to the ingress point 100 of the overlay network. This action can be taken at the time of creation of the virtual network circuit. Additionally, any time the network topology or attribute change is detected (route, gateway, cost etc.) through the automatic discovery process 310, the changes are summarized 315 and incrementally transferred 320 to the ingress point 100. This process is illustrated in FIG. 4.

Figure 4:
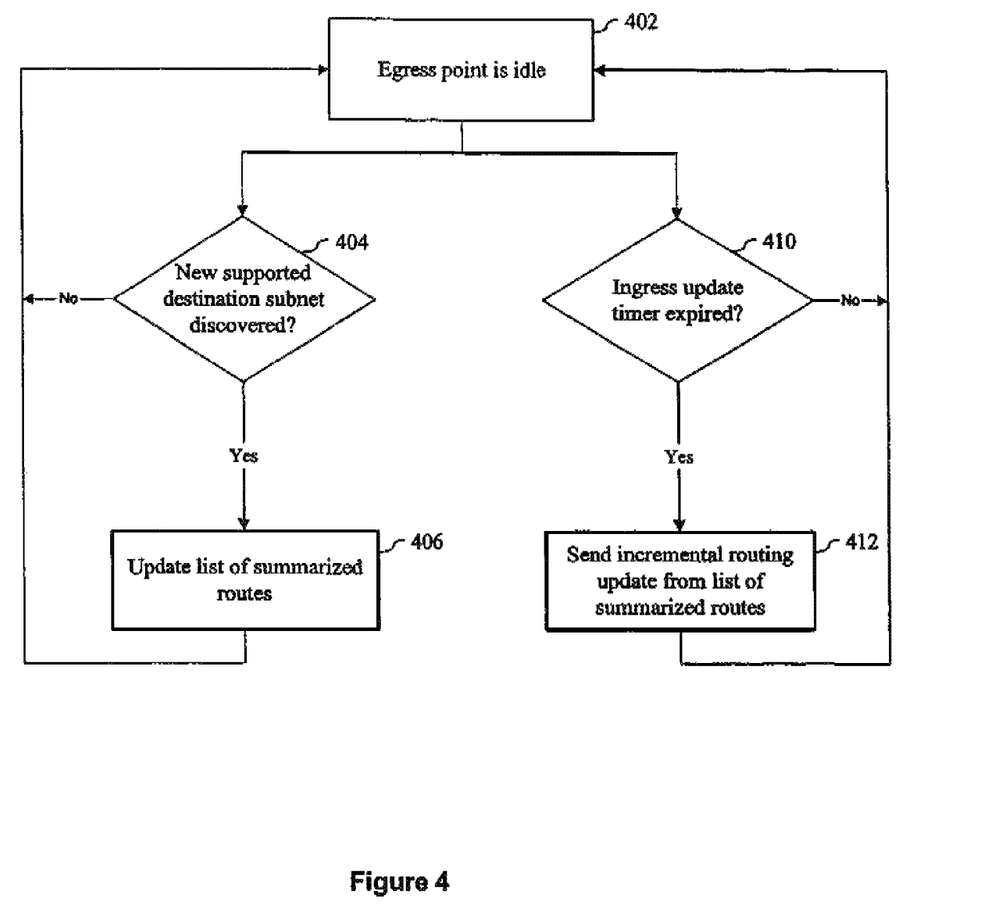
FIG. 4 is a flow chart illustrating a technique for updating route summarization according to one embodiment of the present invention.

FIG. 4 is an illustration of a method for updating an existing route. The egress point 110 can remain idle 402. In one embodiment, when a new supported destination subnet is discovered 404, the egress point 110 is no longer idle. In another embodiment, the egress point 110 may also automatically discover 404 when a destination subnet is no longer supported. The egress point 110 updates 406 the list of summarized routes. The egress point 110 then can return to the idle state 402. In one embodiment, the egress point 110 runs an update ingress timer. This timer is used to indicate when the egress point 110 should forward data to ingress point 100. When an update ingress timer expires 410, the egress point exits the idle state and sends an incremental routing update from the list of summarized routes 412. The update ingress timer may then be reset. Alternatively, the update ingress timer may not be started again until new data is discovered 404. In an alternate embodiment, the egress point 110 may forward the incremental report as soon as the new data is discovered 404. Once the data is forwarded to the ingress point 100, the egress point 110 then can return to the idle state 402.

Figure 6:
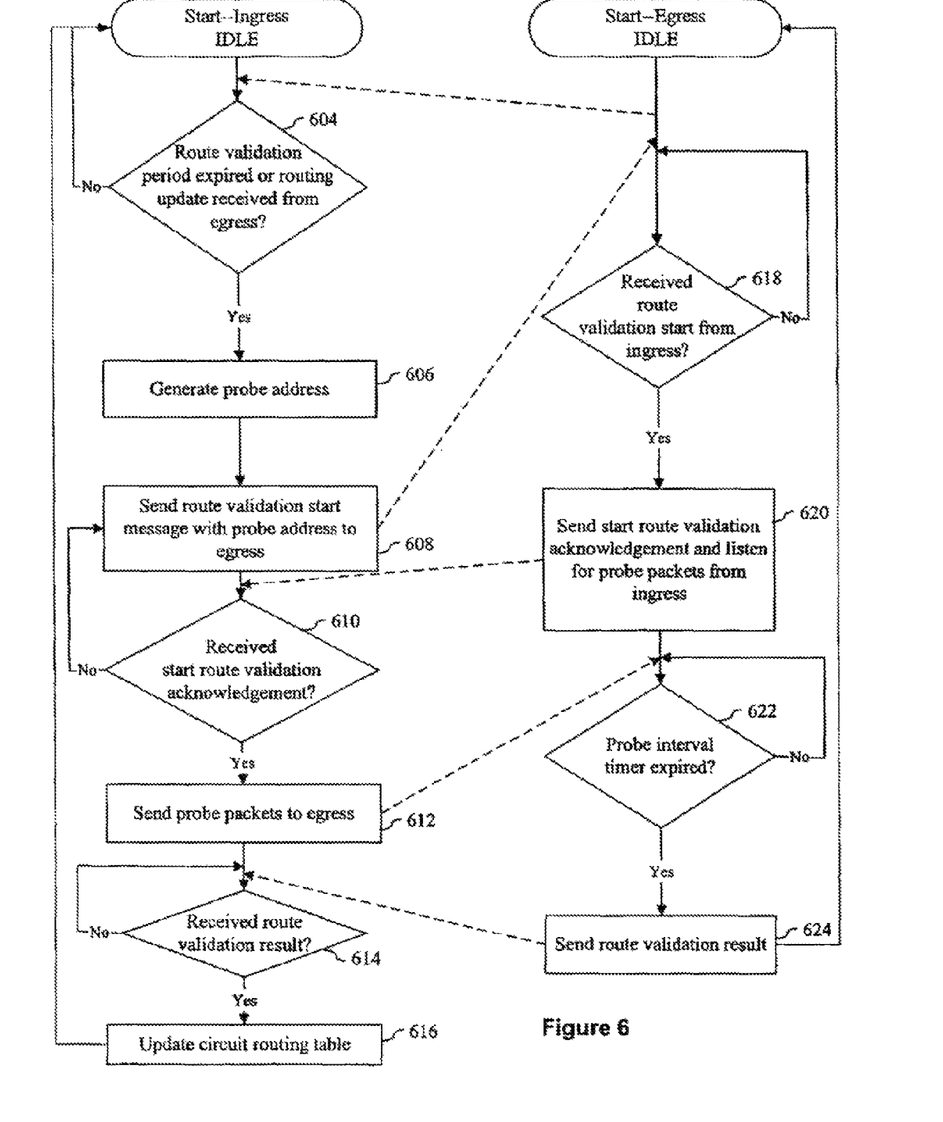
FIG. 6 is a flow chart illustrating a route validation technique according to one embodiment of the present invention.

Once the ingress point 100 has received routing tables from one or more egress points 110, it can then perform route validation 204. FIG. 6 is a flowchart of a route validation procedure according to one embodiment of the present invention. A technique for validating routes is as follows: the ingress point generates 606 a number of host addresses covered by a destination local subnet. In one embodiment the number of host addresses is three. These sample addresses may be equally spaced from each other and selected from the set of addresses belonging to a destination local subnet. The ingress point 100 sends 608 this list of host addresses to the egress point 110 indicating that diagnostic packets can be sent to these host addresses.

After receiving 618 this route validation start information, the egress point 110 acknowledges 620 the receipt of the message, and examines the incoming packets on its remote ports for a probe packet for a time period. In one embodiment the time period is one minute, and is referred to as the probe interval. Once the ingress point 100 receives 610 the acknowledgement, the ingress point 100 sends 612 a specified diagnostic probe packet to each of these host addresses on the base network (not utilizing the overlay network).

During the probe interval 622, the egress point 110 identifies all the probe packets it observes. In one embodiment, it also terminates the probe packets and does not forward these packets to the actual host destination address. In one embodiment, the egress point 110 forwards the second or higher instance of same message because of the possibility that it is meant for another egress point 110 in cascade on the path to the destination host. At the end 622 of the probe interval, the egress point 110 sends 624 the list of validated addresses to the ingress point 100. After receiving 614 the route validation result, the ingress point 100 updates or creates 616 a circuit routing table.

For every destination local subnet received 604 from an egress point 110, the ingress point 100 initiates the route validation procedure to ensure that incoming traffic at the ingress point 100 that is destined to any arbitrary destination covered by a destination local subnet indeed traverses through the egress point 110 that advertised the specific destination local subnet. The following discussion provides an example of the route validation process with reference to FIG. 5 and FIG. 6.

The ingress point 100 generates 606 a number of host addresses covered by a destination local subnet. In one embodiment, the number of host addresses is three. These sample probe addresses may be equally spaced from each other and selected from the set of addresses belonging to a destination local subnet. For example, with reference to FIG. 5, the probe addresses covering a destination subnet 192.168.2.0 and network mask 255.255.255.0 in our example routing information may be 192.168.2.64, 192.168.2.128 and 192.168.2.192. Similarly, the probe addresses covering the destination subnet 192.168.4.100 and network mask 255.255.255.252 may be 192.168.4.100, 192.168.4.101 and 192.168.4.102. Uniqueness in the generated sample addresses is desired but not required. Thus, if the network and mask combination is too restrictive to generate the required number of unique probe addresses, some or all of the sample addresses may be repeated. It may also be noted that there is no need to validate the destination subnet covered by the egress point 110 (e.g. 192.168.1.0 subnet in the example set forth in FIG. 5) since the egress point best represents the subnet which is local to it, and no additional cost will be associated with that particular subnet.

The ingress point 100 sends 608 the list of generated probe addresses to the egress point 110 indicating that diagnostic packets will be sent to these host addresses. The egress point 110 receives 618 and acknowledges 620 the receipt of the message, and examines the incoming packets on its remote ports for the probe packets for the probe interval. The ingress point 100 receives 610 this acknowledgement and sends 612 the specified diagnostic probe packets to these host addresses on the base network (not utilizing the overlay network). During the probe interval, the egress point 110 identifies all the probe packets it observed. In one embodiment, it also terminates the probe packets. That is, the egress point 110 does not forward the probe packets to the actual host destination address. In one embodiment the egress point 110 will however forward the second or higher instance of same message because of the likelihood that it is meant for another egress point 110 in cascade on the path to the destination host. At the end of the probe interval 622 the egress point 110 sends 624 the list of validated addresses to the ingress point 100 that updates or creates 616 it's routing table.

Additionally, the overlay router can periodically validate 604 all the destination local subnets. Route validation can also be done when one of the virtual network circuits is terminated (which may be caused by policy change, unavailability of network element or network breakdown etc.). In this case, the route validation can be done for the full network (i.e., all the routes) or for the routes the virtual network circuit has previously validated.

Figure 7:
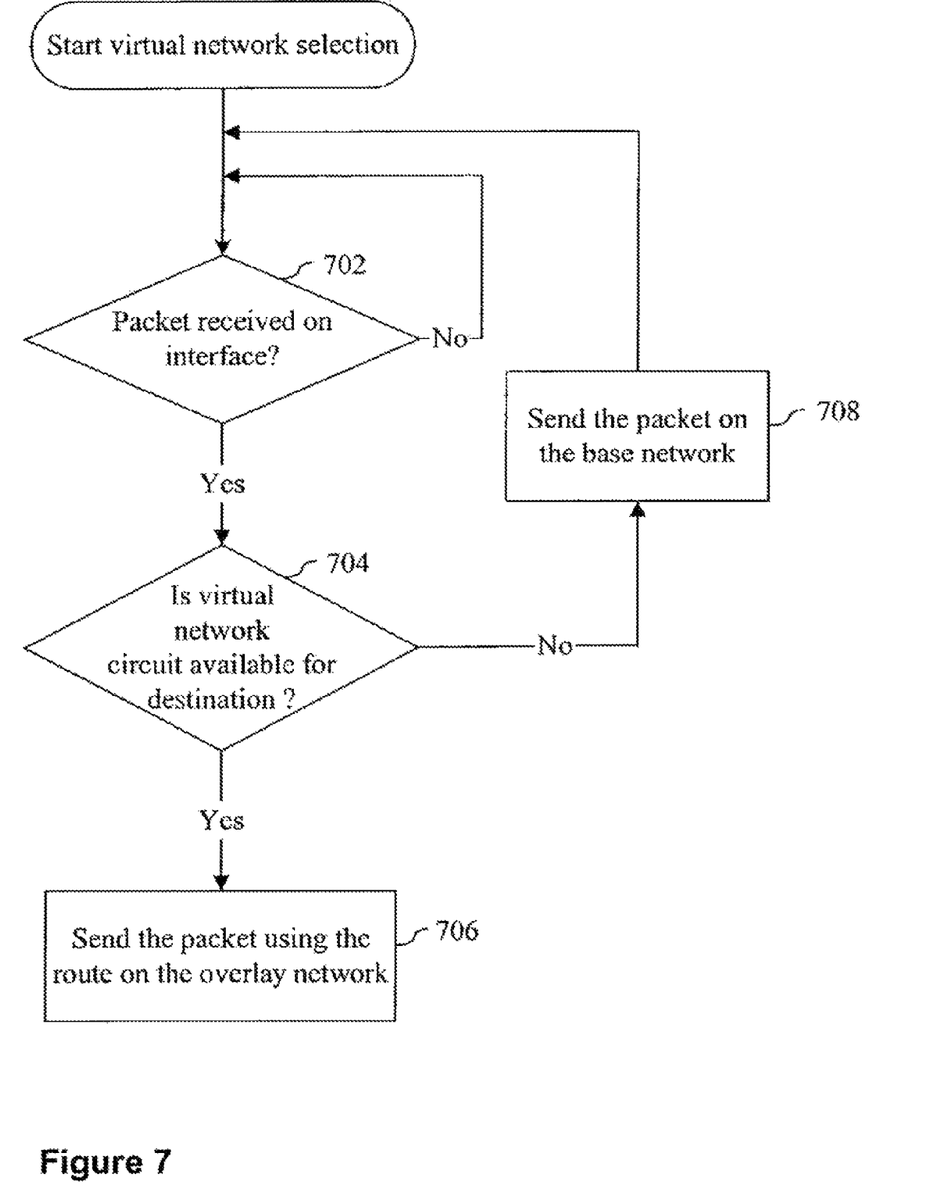
FIG. 7 is a flow chart illustrating virtual network selection according to one embodiment of the present invention.

Once the routes are validated, the present invention performs 206 virtual network circuit selections at the ingress point 100. In one embodiment, the overlay router serving as the ingress point 100 maintains a circuit routing table. The purpose of this table is to enable the ingress point 100 to select the optimal virtual network circuit for any incoming network traffic. Each entry in the table contains a destination local subnet and the egress point 110 that validated the subnet. This table can be populated and updated by the ingress point 100 after a route validation. The validated destination subnets are listed on this table.

FIG. 7 is a flowchart illustrating the virtual network selection process 206 according to one embodiment of the present invention. For any incoming packet that the overlay router can forward 702, it consults the circuit routing table to find a matching entry for the destination address of the packet to determine 704 if a virtual network circuit is available for the destination. If a match is found, the corresponding egress point is selected and the packet is forwarded 706 on the relevant virtual network circuit to reach the egress point. If no match is found, the incoming packet is forwarded 708 on the base network in its un-encapsulated form. In one embodiment, the incoming packet is encapsulated in another header which is addressed to the egress point 110 selected in step 704. The egress point 110 then strips the additional header and forwards the packet to its destination. In this manner, the ingress point 110 is ensured that that packet took the fastest available route through the base network.

Table 3 is an example of a circuit routing table at the ingress point 192.168.0.100 and may be used by an ingress point 110 to select a virtual network circuit.

TABLE 3

| Destination | Route Mask | Metric | Protocol | Egress Point |
|---|---|---|---|---|
| 192.168.1.0 | 255.255.255.0 | 0 | OSPF | 192.168.1.100 |
| 192.168.2.0 | 255.255.255.0 | 1 | OSPF | 192.168.2.111 |
| 192.168.3.0 | 255.255.255.0 | 2 | RIP | 192.168.1.100 |
| 192.168.4.100 | 255.255.255.252 | 5 | OSPF | 192.168.1.100 |
| 192.168.4.200 | 255.255.255.240 | 4 | OSPF | 192.168.2.111 |
| 192.168.6.0 | 255.255.255.0 | 2 | RIP | 100.200.1.200 |
| 192.168.7.0 | 255.255.255.0 | 5 | OSPF | 100.200.2.222 |

The above table indicates that for the destination subnet 192.168.2.0 and subnet mask 255.255.255.0, the selected egress point is 192.168.2.111. The egress point 110 with IP address 192.168.1.100 also advertised the same destination network as shown in Table 1. The reason for the selection of 192.168.2.111 is because this egress point has validated the probe packets destined for the network and the cost to reach the destination network is smaller (1) from 192.168.2.111 compared to the cost to reach the same destination network from 192.168.1.100 (1000). The destination subnet 192.168.5.0 with network mask 255.255.255.0, which is advertised by egress point 110 with IP address 192.168.1.100 is not included in the circuit routing table for ingress point 100 with IP address 192.168.0.100. The reason is because the egress point could not validate the probe packets destined for this network.

An efficient way to store information in circuit routing table is similar to a conventional routing table. A Patricia tree, radix tree or other variations of balanced binary tree can be effectively used for fast table lookup. An overlay router examines 704 the incoming packet for the destination address. It performs a table lookup to check if there is a destination local subnet entry that covers the destination address. If multiple circuits are available for a destination local subnet, the circuit list is sorted in increasing order of cost (or any other measures of optimality for an application—function of cost and hop count to the egress point etc.). Thus the front of the list gives the optimal circuit to be used for the incoming packet.

In one embodiment, a probabilistic method is used to select a circuit. In this embodiment the ingress point 100 sends a larger number of diagnostic probe packets covering the destination local subnet. In one embodiment, the number of diagnostic probe packets is 100. Each egress point 110 responds with the number of the probe packets observed by it. These numbers form the basis for the weights to be assigned to the overlay network circuits. The ingress point 100 can probabilistically select any of these egress points 100 in line with their weights. If not all probe packets are acknowledged by the corresponding egress point(s), the circuit selection mechanism at an ingress point 100 may select the virtual network circuit and the base network at a frequency in line with the number of probe responses received.

While the invention has been particularly shown and described with reference to a preferred embodiment and several alternate embodiments, it will be understood by persons skilled in the relevant art that various changes in form and details can be made therein without departing from the spirit and scope of the invention.

What is claimed is:

1. A router comprising:
 a processor;
 a plurality of interfaces;
 a network routing table specifying a plurality of virtual circuits forming an overlay network through a base network;
 wherein the router operates as an ingress router for the overlay network,
 wherein the router receives a communication from an egress router that includes information corresponding to a local destination subnet associated with the egress router,
 wherein the router is configured to include the information in the network routing table, and
 wherein the router validates a route through the base network to the destination local subnet listed in the network routing table by: (i) generating a plurality of addresses within the destination local subnet, (ii) sending a list of the addresses to the egress router to direct the egress router to monitor for diagnostic probe packets associated with the addresses, (iii) transmitting at least one probe packet to one or more of the addresses, and (iv) receiving confirmation of detection from the egress router.

2. The router of claim 1,
 wherein the router selects one of the virtual circuit for transporting a data packet as encapsulated data to the egress router, the selected virtual circuit beginning at the router and ending at the egress router, and
 wherein the router selects the virtual circuit responsive to the network routing table and a destination of the data packet.

3. The router of claim 1 wherein the base network is one of a point-to-point network, a multi-point network, or a dynamic multi-point network.

4. The router of claim 1 wherein the information received by the router from the egress router represents changes to the associated local destination subnet.

5. The router of claim 1 wherein the information includes at least one of a network IP address, a route mask, a gateway IP address of the next hop router, an interface type, a route type, a route protocol, a route age, or a route cost.

6. The router of claim 1:
  wherein the network routing table comprises an entry corresponding to a second destination local subnet, and
  wherein the router validates the entry by sending a probe packet to an address located in the second destination local subnet and receiving a confirmation from a second egress router that the probe packet was detected.

7. The router of claim 1 wherein the router is configured to transmit a plurality of probe packets to a plurality addresses located in the destination local subnet.

8. The router of claim 1 wherein the information comprises network traffic statistics associated with the destination local subnet.

9. A router comprising:
  a processor executing software instructions,
  wherein the router is configured to operates as an egress router for a plurality of virtual circuits forming an overlay network through a base network;
  wherein the router outputs a communication to an ingress router for the overlay network, the communication including information corresponding to a local destination subnet associated with the router, and
  wherein the router receives a list of the addresses from the ingress router directing the router to monitor for diagnostic probe packets associated with the addresses, receives one or more of the probe packets from the ingress router to validate a route through the base network to the destination local subnet, and outputs a confirmation of detection to the ingress router.

10. The router of claim 9 wherein the information comprises network traffic statistics associated with the destination local subnet.

11. The router of claim 9 wherein the information includes at least one of a network IP address, a route mask, a gateway IP address of the next hop router, an interface type, a route type, a route protocol, a route age, or a route cost.

\* \* \* \* \*